(12) United States Patent
Edmiston

(10) Patent No.: US 9,144,784 B2
(45) Date of Patent: *Sep. 29, 2015

(54) SORBENT MATERIAL AND METHOD FOR USING THE SAME

(71) Applicant: ABS MATERIALS, INC., Wooster, OH (US)

(72) Inventor: Paul L. Edmiston, Wooster, OH (US)

(73) Assignee: ABS MATERIALS, Wooster, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,326

(22) Filed: Jan. 15, 2014

(65) Prior Publication Data

US 2014/0135212 A1     May 15, 2014

Related U.S. Application Data

(63) Continuation-in-part of application No. 13/025,445, filed on Feb. 11, 2011, now Pat. No. 8,754,182, which is a continuation-in-part of application No. 12/560,002, filed on Sep. 15, 2009, now Pat. No. 8,367,793, which is a continuation-in-part of application No. 11/537,944, filed on Oct. 2, 2006, now Pat. No. 7,790,830.

(60) Provisional application No. 60/722,619, filed on Sep. 30, 2005.

(51) Int. Cl.

| C08G 77/18 | (2006.01) |
|---|---|
| B01J 20/26 | (2006.01) |
| B01D 53/02 | (2006.01) |
| C02F 1/28 | (2006.01) |
| B01J 20/32 | (2006.01) |
| B09C 1/08 | (2006.01) |
| B01J 20/02 | (2006.01) |
| B01J 20/10 | (2006.01) |
| B01J 20/28 | (2006.01) |
| C08L 83/06 | (2006.01) |
| C08L 83/14 | (2006.01) |
| B82Y 30/00 | (2011.01) |
| C08G 77/52 | (2006.01) |
| C08G 77/00 | (2006.01) |
| C02F 101/30 | (2006.01) |
| C02F 103/30 | (2006.01) |
| C02F 103/34 | (2006.01) |

(52) U.S. Cl.

CPC ............ *B01J 20/26* (2013.01); *B01D 53/02* (2013.01); *B01J 20/0225* (2013.01); *B01J 20/0229* (2013.01); *B01J 20/0244* (2013.01); *B01J 20/103* (2013.01); *B01J 20/265* (2013.01); *B01J 20/2803* (2013.01); *B01J 20/28011* (2013.01); *B01J 20/28047* (2013.01); *B01J 20/3221* (2013.01); *B01J 20/3236* (2013.01); *B09C 1/08* (2013.01); *C02F 1/285* (2013.01); *C02F 1/288* (2013.01); *C08L 83/06* (2013.01); *C08L 83/14* (2013.01); *B01D 2253/25* (2013.01); *B01D 2253/308* (2013.01); *B82Y 30/00* (2013.01); *C02F 2101/301* (2013.01); *C02F 2101/308* (2013.01); *C02F 2103/30* (2013.01); *C02F 2103/343* (2013.01); *C02F 2305/08* (2013.01); *C08G 77/18* (2013.01); *C08G 77/52* (2013.01); *C08G 77/70* (2013.01)

(58) Field of Classification Search

CPC ........... B01J 20/26; C08G 77/52; B09C 1/08; C08L 83/06; C02F 1/28
USPC .................................... 520/402, 407; 528/34
See application file for complete search history.

(56) References Cited

U.S. PATENT DOCUMENTS

| 5,563,707 | A | 10/1996 | Prass et al. | |
|---|---|---|---|---|
| 7,358,318 | B1 | 4/2008 | Tavlarides et al. | |
| 7,790,830 | B2 | 9/2010 | Edmiston | |
| 8,367,793 | B2 * | 2/2013 | Edmiston | 528/35 |
| 8,754,182 | B2 * | 6/2014 | Edmiston | 528/35 |
| 2002/0070168 | A1 | 6/2002 | Jiang et al. | |
| 2002/0185444 | A1 | 12/2002 | Coronado et al. | |
| 2003/0159997 | A1 * | 8/2003 | Markowitz et al. | 210/670 |
| 2004/0092004 | A1 | 5/2004 | Stanford et al. | |
| 2004/0169157 | A1 | 9/2004 | Coronado et al. | |
| 2004/0191516 | A1 | 9/2004 | Jiang et al. | |
| 2005/0221087 | A1 | 10/2005 | Economy et al. | |
| 2006/0113231 | A1 | 6/2006 | Malik | |
| 2006/0292033 | A1 | 12/2006 | Blok | |
| 2007/0059211 | A1 | 3/2007 | Edmiston | |
| 2007/0073095 | A1 | 3/2007 | White et al. | |

(Continued)

FOREIGN PATENT DOCUMENTS

| EP | 2072117 | 6/2009 |
|---|---|---|
| JP | H05-261284 | 12/1993 |

(Continued)

OTHER PUBLICATIONS

Burleigh, Environ. Sci. Technol. 36 (2002) 2515-2518.

(Continued)

*Primary Examiner* — Kuo-Liang Peng

(74) *Attorney, Agent, or Firm* — Arent Fox LLP

(57) ABSTRACT

Disclosed is a swellable, sorbent material formed of a sol-gel composition having a porous matrix and a sorbent property modifier intermixed with at least a portion of the porous matrix. The sorbent property modifier modifies a sorbent property of the sorbent material when compared to the same sorbent property of the corresponding, unmodified sol-gel composition.

17 Claims, 1 Drawing Sheet

(56) References Cited

U.S. PATENT DOCUMENTS

| | | |
|---|---|---|
| 2007/0112242 A1 | 5/2007 | Edmiston |
| 2007/0122333 A1 | 5/2007 | Yang |
| 2009/0028912 A1 | 1/2009 | Dave |
| 2009/0098082 A1 | 4/2009 | Wilson et al. |
| 2009/0294726 A1 | 12/2009 | Hamada et al. |
| 2010/0092840 A1 | 4/2010 | Konno et al. |
| 2010/0096334 A1 | 4/2010 | Edmiston |
| 2010/0108612 A1 | 5/2010 | Edmiston et al. |
| 2010/0113856 A1 | 5/2010 | Edmiston |
| 2011/0000658 A1 | 1/2011 | Tanaka et al. |
| 2011/0049056 A1 | 3/2011 | Wyndham et al. |
| 2011/0132845 A1* | 6/2011 | Edmiston ............... 210/688 |

FOREIGN PATENT DOCUMENTS

| | | |
|---|---|---|
| JP | H06-134315 | 5/1994 |
| JP | 2004-525053 | 8/2004 |
| WO | WO00-16898 | 3/2000 |
| WO | WO2005028604 | 3/2005 |
| WO | WO2007112242 | 10/2007 |
| WO | WO2009126207 | 10/2009 |
| WO | WO2010141426 | 12/2010 |
| WO | WO2013019965 | 2/2013 |

OTHER PUBLICATIONS

International Search Report dated Nov. 2, 2010 for PCT International Application No. PCT/US2010/048670.

International Preliminary Examination Report—Application No. 10757891.6-1214, European Patent Office—Netherlands, Feb. 7, 2013.

Boury et al., "Auto-Organization in Sol-Gel Type Polycondensation: A Door to the Nanosciences," The Chemical Record, 3(2):120-132 (2003).

Burkett et al., "Highly Swellable Sol-Gels Prepared by Chemical Modification of Silanol Groups Prior to Drying", Journal of Non-Crystalline Solids, 351:3174-3178 (2005).

Burkett et al., "Organic-Inorganic Hybrid Materials that Rapidly Swell in Non-Polar Liquids: Nanoscale Morphology and Swelling Mechanism", Chem. Mater., 20:1312-1321 (2008).

Cerveau et al., "Influence of Kinetic Parameters on the Textural and Chemical Properties of Silsesquioxane Materials Obtained by Sol-Gel Process", J. Mater. Chem., 9:1149-1154 (1999).

Cerveau et al., "Sol-Gel Process: Influence of the Temperature on the Textural Properties of Organosilsesquioxane Materials", J. Mater. Chem., 10:1617-1622 (2000).

Cerveau et al., "Nanostructured Organic-Inorganic Hybrid Materials: Kinetic Control of the Texture", Chem. Mater., 13:3373-3388 (2001).

Dave et al., "Osmoresponsive Glasses; Osmotically Triggered Volume Changes of Organosilica Sol-Gels as a Means for Controlled Release of Biomolecules", Adv. Mater., 18:2009-2013 (2006).

Edmiston et al., "Absorption of Dissolved Organic Species from Water Using Organically Modified Silica that Swells", Separation and Purification Technology, 66:532-540 (May 7, 2009).

Rao et al., "Thermoresponsive Glasses: Temperature-Controlled Rapid Swelling and Deswelling of Silica-Based Sol-Gels", Adv. Mater., 13(4):274-276 (2001).

RAOet al., "Smart Glasses: Molecular Programming of Rapid Dynamic Responses in Organosilica Sol-Gels", Adv. Mater., 14(6):443-447 (2002).

Rao et al., "Smart Glasses: Molecular Programming of Rapid Dynamic Responses in Organosilica Sol-Gels", Journal of Sol-Gel Science and Technology, 26:553-560 2003).

Official Communication dated Sep. 12, 2013 regarding Mexico Application No. MX/a/2012-2003195, and English Translation.

Notice of Reasons for Rejection dated Jan. 28, 2014 regarding Japan Application No. JP2012-529819.

International Preliminary Report on Patentability dated Jul. 19, 2013 from related International Application No. PCT/US2012/049359.

Written Opinion and International Search Report dated Dec. 19, 2012 from related International Application No. PCT/US2012/049359.

International Search Report dated Dec. 27, 2010 for PCT International Application No. PCT/US2010/048663.

International Publication WO2013/019965A1, dated Feb. 7, 2013, and International Search Report dated Dec. 19, 2012 regarding PCT/US2012/049359.

International Preliminary Report on Patentability dated Jul. 13, 2013 and Written Opinion dated Dec. 19, 2012 regarding PCT/US2012/049359.

International Preliminary Report on Patentability dated Mar. 20, 2012 and Written Opinion dated Nov. 2, 2010 for PCT International Application No. PCT/US2010/048670.

First Office Action dated Aug. 7, 2013 regarding China Patent Application No. CN201080049898.1.

Second Office Action dated Mar. 13, 2014 regarding China Patent Application No. CN201080049898.1.

Official Communication dated Sep. 12, 2013 regarding Mexico Patent Application No. MX/a/2012/003195.

Notice of Reasons for Rejection dated Jan. 13, 2015, regarding Japan Application No. JP2012529819.

* cited by examiner

SORBENT MATERIAL AND METHOD FOR USING THE SAME

CROSS REFERENCE TO RELATED APPLICATION

This application is a Continuation-in-Part of U.S. patent application Ser. No. 13/025,445, filed Feb. 11, 2011, which is a Continuation-in-Part of U.S. patent application Ser. No. 12/560,002, filed Sep. 15, 2009, which claims priority on U.S. patent application Ser. No. 11/537,944, filed Oct. 2, 2006 (now U.S. Pat. No. 7,790,830 B2), which claims priority on U.S. provisional patent application No. 60/722,619, filed on Sep. 30, 2005, which applications are all herein incorporated by reference in their entirety.

STATEMENT REGARDING FEDERALLY FUNDED RESEARCH OR DEVELOPMENT

This invention was made with Government support under National Science Foundation Grant SBIR award #1013263.

BACKGROUND OF THE INVENTION

1. Field of the Invention

The present invention relates generally to the chemical arts. More particularly, the invention relates to a material for use in removing sorbates, including contaminants, from a gas or an aqueous solution and a method for using the sorbent material.

2. Discussion of the Related Art

Substantial effort has been directed to the removal of sorbates, such as contaminants, from gas or aqueous liquid phases, such as from processed water from pharmaceutical or textile fabrication operations. Examples of contaminants include dyes (e.g., azo dyes, eosin yellow, methylene blue, malachite green, methyl orange, orange G) and ionic surfactants (e.g., sodium dodecyl sulfate and benzalkonium chloride). The release of these contaminants into the environment (e.g., via wastewater discharge) can pose serious health hazards.

Presently, contaminants are removed from gases or aqueous solutions by either adsorption (e.g., onto granular activated carbon) or chemical processes, such as electrolysis or ozonation. These methods, however, produce a substantial amount of waste and are expensive. Additionally, such methods have a limited absorption capability in terms of both the total quantity and type of contaminant removed from the gas or aqueous solution.

SUMMARY OF THE INVENTION

The present invention generally relates to sorbent materials and methods of use, and more particularly to a swellable hydrophobic material for sorbing or extracting a sorbate, including a contaminant, from an aqueous medium. Now in accordance with the invention there has been discovered a novel sorbent material containing a sol-gel composition having a porous matrix and a sorbent property modifier intermixed with at least a portion of the porous matrix. The sorbent property modifier modifies a sorbent property of the sorbent material when compared to the same sorbent property of the corresponding, unmodified sol-gel composition. For example, in some embodiments, the sorbent property is the selectivity for a sorbate. In other embodiments, the sorbent property is the capacity for a sorbate.

In some embodiments, the sol-gel composition is swellable to at least 1.5 times its volume in an organic sorbate.

And in some embodiments, the sol-gel composition is an aromatically-bridged, organosiloxane sol-gel composition, containing a plurality of alkyl siloxy substituents, the aromatically-bridged, organosiloxane sol-gel composition having a porous matrix. In some embodiments, the swellable, aromatically-bridged, organosiloxane sol-gel composition is derived from a trialkoxysilane corresponding to the formula:

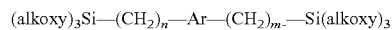

where n and m are individually an integer from 1 to 8, Ar is a single-, fused-, or poly-aromatic ring, and each alkoxy is independently a $C_1$ to $C_5$ alkoxy. Preferred trialkoxysilanes include bis(trialkoxysilylalkyl)benzene with 1,4-bis(trimethoxysilylmethyl)benzene or bis(triethoxysilylethyl)benzene being most preferred.

In some embodiments, the alkyl siloxy substituents correspond to the formula:

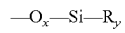

where R is independently a hydrocarbon containing up to about 30 carbons, x is 1 or 2, y is 2 or 3 and the total of x and y is 4. And in some embodiments the alkyl siloxy substituents additionally include at least one heteroatom selected from sulfur, oxygen, nitrogen, phosphorus, or halogen atoms or combinations thereof.

In some embodiments, the sorbent property modifier is a polymer, pendant group, coupling agent, nanoparticle or combinations thereof. Preferred polymers include polar organic polymers, such as poly(4-styrene sulfonic acid), poly(4-styrene sulfonic acid co-maleic acid), polyethylenimine, polystyrene, polyvinylphenol, polymethylmethacrylate, polyphenylene sulfide or combinations thereof. Preferred pendant groups include polar pendant groups, such as nitro or sulfonate groups.

In some embodiments, the sorbent material additionally contains a binder, such as a polymeric binder. Useful polymeric binders include microcrystalline cellulose and elastomeric polymers. Preferred elastomeric polymers have a glass transition temperature below about 150 C. For, example, polystyrene is a currently most preferred elastomeric polymer binder. In some embodiments, the binder is present in an amount of at least 50% and in some embodiments at least 95% and in some embodiments at least 99.5% based on the weight of the sorbent material.

Now in accordance with the invention there also has been discovered a novel method for removing a sorbate, such as a contaminant, from a gas or an aqueous solution containing the sorbate. The method includes the steps of contacting the sorbent material with a gas or an aqueous solution containing a sorbate to be removed and then separating the sorbent material from the gas or the aqueous solution.

In some embodiments, the sorbate is dissolved in an aqueous solution and the method is of especial use where the sorbate has a log $k_{ow}$>−0.32 and a molecular weight less than 1,000,000 or a log $k_{ow}$>1.25 and a molecular weight less than 2,000. And in some embodiments, the contaminant is a textile dye or an ionic surfactant. Additionally in some embodiments, the contaminant is negatively-charged and the property modifier is positively-charged. And in still other embodiments, the contaminant is positively-charged and the property modifier is negatively-charged.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE PREFERRED EMBODIMENTS

Figure 1:
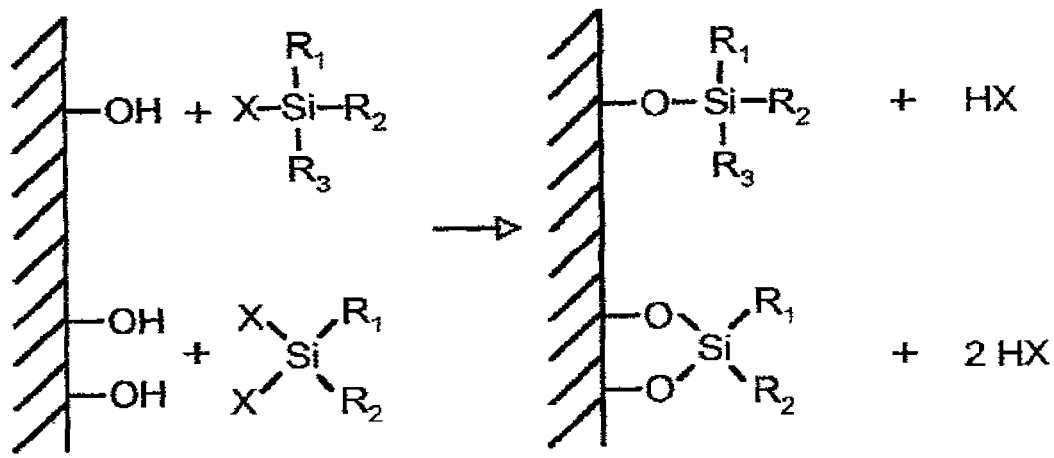
FIG. 1 is a representation of exemplary derivatization reactions used during the preparation of one embodiment of the sol-gel composition in accordance with the invention.

Particular embodiments of the invention are described below in considerable detail for the purpose of illustrating its principles and operation. However, various modifications may be made, and the scope of the invention is not limited to the exemplary embodiments described below. For example, while particular emphasis is made on the removal of undesirable contaminants, it will be appreciated the method is of equal use in extracting desirable sorbates, including biologics, such as DNA.

Unless otherwise defined, all technical terms used herein have the same meaning as commonly understood by one of ordinary skill in the art to which the present invention pertains.

As used herein, "sorbate" refers to a compound taken up by the sorbent materials of the present invention, whether by adsorption, absorption, or a combination thereof.

In accordance with the invention, there has been discovered a novel sorbent material for removing a sorbate from a gas or an aqueous solution. The sorbent material is formed of a sol-gel composition having a porous matrix and a sorbent property modifier intermixed with at least a portion of the porous matrix, where the sorbent property modifier modifies a sorbent property of the sorbent material when compared to the same sorbent property of the unmodified sol-gel composition.

In some embodiments, the sol-gel composition, prior to modification, is swellable to at least 1.5 times its original volume in a sorbate. Preferred sol-gel compositions are swellable to at least two times their original volume, more preferably at least five times their original volume, and in some embodiments up to about eight to ten times their original volume in an sorbate.

And in some embodiments, the sorbent material is formed of an aromatically-bridged, organosiloxane, sol-gel composition containing a plurality of alkyl siloxy substituents. In such embodiments, the sol-gel composition contains a plurality of flexibly tethered and interconnected organosiloxane particles having diameters on the nanometer scale. The organosiloxane nanoparticles form a disorganized porous matrix defined by a plurality of cross-linked aromatic siloxanes that create a porous structure having a first surface chemistry.

The porous, swellable, aromatically bridged, organosiloxane sol-gel compositions contain a plurality of polysiloxanes that include an aromatic bridging group flexibly linking the silicon atoms of the polysiloxanes. Such organosiloxane nanoparticles have a multilayer configuration comprising a hydrophilic inner layer and a hydrophobic, aromatic-rich outer layer.

The sorbent materials are formed of a sol-gel composition obtained using a sol-gel reaction beginning with trialkoxysilanes containing an aromatic bridging group. Suitable trialkoxysilanes include, without limitation, trialkoxysilanes corresponding to the formula:

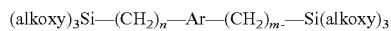

wherein n and m are individually an integer from 1 to 8, Ar is a single-, fused-, or poly-aromatic ring, and each alkoxy is independently a $C_1$ to $C_5$ alkoxy. Bis(trialkoxysilylalkyl)benzenes are preferred and include 1,4-bis(trimethoxysilylmethyl)benzene (BTB), bis(triethoxysilylethyl)benzene (BTEB), and mixtures thereof, with bis(triethoxysilylethyl) benzene being most preferred.

The trialkoxysilanes are preferably present in the reaction medium at between about 0.25M and about 1M, more preferably between about 0.4M and about 0.8M, most preferably between about 0.4M and about 0.6M.

Conditions for sol-gel reactions are well-known in the art and include the use of acid or base catalysts in appropriate solvents. Preferred conditions are those that contain a base catalyst in any suitable solvent. Exemplary base catalysts include, without limitation, tetrabutyl ammonium fluoride ("TBAF"), 1,5-diazabicyclo[4.3.0]non-5-ene ("DBN"), and alkylamines (e.g., propyl amine), of which TBAF is preferred. Suitable solvents for use with the base catalysts include, without limitation, tetrahydrofuran ("THF"), acetone, dichloromethane/THF mixtures containing at least 15% by vol. THF, and THF/acetonitrile mixtures containing at least 50% by vol. THF. Of these exemplary solvents, THF is preferred.

As noted above, acid catalysts can be used to form swellable sol-gel compositions, although acid catalysts are less preferred. Exemplary acid catalysts include, without limitation, any strong acid such as hydrochloric acid, phosphoric acid, sulfuric acid, etc. Suitable solvents for use with the acid catalysts include those identified above for use with base catalysts.

After gellation, the resulting sol-gel material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under reduced pressure, or in a container or oven.

Solvent and catalyst extraction (i.e., rinsing) is carried out during or after the aging process. Preferred materials for extraction include, without limitation, any organic solvent of medium polarity, THF, acetone, ethanol, and acetonitrile, either alone or in combination.

As shown in FIG. 1, after rinsing, the sol-gel material is characterized by the presence of residual silanols. The silanol groups allow for derivatization of the gel using any reagent that includes both one or more silanol-reactive groups and one or more non-reactive alkyl groups. The derivatization process results in the end-capping of the silanol-terminated polymers present within the sol-gel with alkyl siloxy groups having the formula:

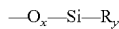

where each R is independently an aliphatic or non-aliphatic hydrocarbon containing up to about 30 carbons, with or without one or more hereto atoms (e.g., sulfur, oxygen, nitrogen, phosphorus, and halogen atoms), including straight-chain hydrocarbons, branched-chain hydrocarbons, cyclic hydrocarbons, and aromatic hydrocarbons, x is 1 or 2, y is 2 or 3 and the total of x and y is 4.

Figure 2:
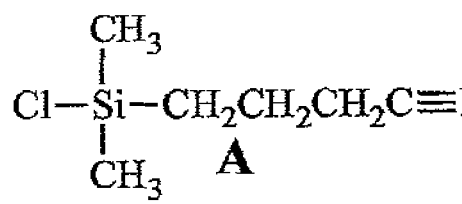
FIG. 2 identifies exemplary chlorosilanes used to derivatize silanols during the preparation of one embodiment of the sol-gel composition in accordance with the invention.
Figure 2:
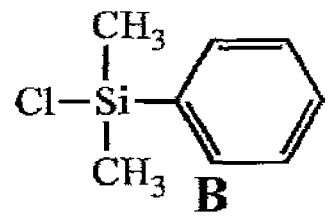
Figure 2:
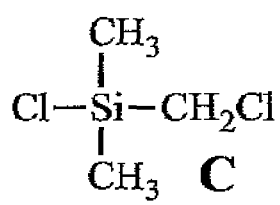
Figure 2:
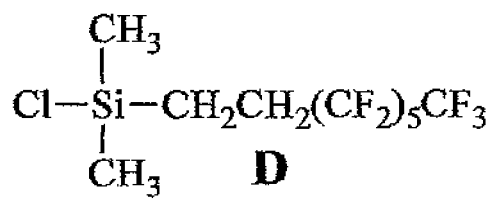
Figure 2:
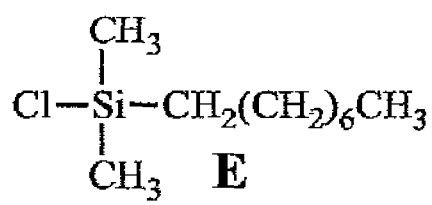
Figure 2:
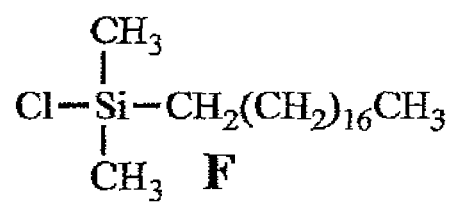

One suitable class of derivatization reagents includes halosilane reagents that contain at least one halogen group and at least one alkyl group R, as defined above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethylchlorosilane, phenyldimethylchlorosilane, chloromethyldimethylchlorosilane, (trideca-fluoro-1,1,2,2-tetrahydrooctyl)dimethylchlorosilane, n-octyldimethylchlorosilane, and n-octadecyldimethylchlorosilane. The structures of these exemplary reagents are shown in FIG. 2.

Another suitable class of derivatization reagents includes silazanes or disilazanes. Any silazane with at least one reactive group X and at least one alkyl group R, as defined above can be used. A preferred disilazane is hexamethyldisilazane.

After derivatizing, the reaction mixture is preferably rinsed in any of the rinsing agents described above, and then dried. Drying can be carried out under any suitable conditions, but preferably in an oven, e.g., for about 2 hr at about 60 C to produce the porous, swellable, sol-gel composition.

In some embodiments, the resulting sol-gel composition is swellable to at least 1.5 times its original volume in a sorbate. Preferred sol-gel compositions are swellable to at least two times their original volume, more preferably at least five times their original volume, most preferably up to about eight to ten times their original volume in a sorbate. A suitable swellable sol-gel composition is Osorb® swellable sol-gel composition available from ABS Materials, Wooster, Ohio.

The sorbent material additional includes a sorbent property modifier intermixed with at least a portion of the porous matrix. The sorbent property modifier modifies a sorbent property of the sorbent material when compared to the same sorbent property of the corresponding, unmodified porous, sol-gel composition by modifying and at least partially defining the surface chemistry of the porous matrix.

It is a distinct advantage of the invention that a wide variety of sorbent properties can be improved, including, but not limited to, the selectivity of the sorbent material for a sorbate and the capacity of the sorbent material for the sorbate. For example, the sorbent property modifier can modify the surface chemistry by changing the chemisorption and/or physisorption properties of at least a portion of the surface chemistry of the sorbent material.

Suitable sorbent property modifiers include polymers (e.g., polar organic polymers), pendant groups (e.g., polar pendant groups), coupling agents, nanoparticles and the like and combinations thereof. Useful polar organic polymers include any natural or synthetic polymer having a non-zero dipole moment. Representative polar organic polymers include both anionic polymers, such as poly(4-styrene sulfonic acid co-maleic acid) and poly(4-styrenesulfonic acid) ("PSS"), and cationic polymers, such as polyethylenimine. Other non-limiting examples of polar organic polymers include polystyrene, polyvinylphenol, polymethylmethacrylate, polyphenylene sulfide, poly(ethyleneimine) ("PEI"), polyethylene glycol ("PEG"), polycarbonate, polyester, polyurethane, combinations thereof, and blends thereof with other polymers and copolymers of the monomers thereof.

Useful polar pendant groups include at least one atom capable of modifying the surface chemistry of the porous structure. Representative polar pendant groups include at least one atom (e.g., sulfur, nitrogen or halogen atom) coupled to the porous matrix. Suitable pendant polar groups include a nitro or sulfonate group coupled to an aromatic bridging group or silicon center (e.g., coupled to a silicon center by derivation of silanol groups) of at least one organosilica nanoparticle.

Useful coupling agents include any molecule or compound that directly or indirectly promotes the coupling of two or more chemical compounds.

Useful nanoparticles include any particle having a diameter of less than about 300 nm.

By modifying the surface chemistry of the porous structure to match the chemistry of a sorbate, the sorbent properties of the sorbent material vis a vis the sorbate are improved. For example, using a positively-charged sorbent modifier, such as a cationic sorbent modifier, produces a sorbent material having a sorbent property that differs, such as improved sorbate selectivity or sorbate capacity for negatively-charged, such as anionic, sorbates when compared to the same sorbent property of the corresponding unmodified aromatically-bridged, organosiloxane sol-gel composition. Similarly, using a negatively charged sorbent modifier, such as an anionic sorbent modifier, produces a sorbent material having a sorbent property that differs, such as improved sorbate selectivity or sorbate capacity for a positively-charged, such as a cationic, sorbate, when compared to the same sorbent property of the corresponding unmodified aromatically-bridged, organosiloxane sol-gel composition.

The property modifier can be intermixed with at least a portion of the porous matrix by any suitable method. In some embodiments, the property modifier is disposed on the on the porous matrix, by, for example, forming a thin film on the porous, such as by sputter coating or thermal deposition or e-beam deposition or the like. In other embodiments, the property modifier is dispersed in the porous matrix. In still other embodiments, the property modifier is chemically bound to at least a portion of the polymer matrix.

In one embodiment of the present invention, the sorbent property modifier is intermixed with at least a portion of the porous matrix by dissolving the swellable, sol-gel composition in an organic solvent or organic solvent system (such as an organic solvent system comprising 90% ethanol and 10% water, by weight) for the sorbent property modifier to form a sorbent property modifier solution and then adding the swellable, sol-gel composition to the sorbent property modifier solution. The concentration of the sorbent modifier in the solution is typically from about 0.01 mg/mL to about 10 mg/mL.

The swellable, sol-gel composition is added to sufficient property modifier solution to cause the sol-gel composition to swell from about one and eight times its original volume, thus facilitating the dispersing of the sorbent property modifier into the porous structure. The resulting sorbent material is then dried by evaporating the organic solvent or organic solvent system at room temperature or elevated temperature (e.g., up to about 150 C), which collapses the porous structure around the sorbent property modifier as the sorbent material returns to its unswollen state. The dried material is then ready for use as a sorbent.

In another example of the present invention, the sorbent property modifier is intermixed with at least a portion of the porous matrix by coupling polar pendant groups to the at least a portion of the porous structure using any one or more combinations of known organic reactions. Examples of suitable organic reactions include substitution reactions in which functional groups of the sol-gel composition are replaced by other groups. In an electrophilic substitution reaction, for example, an electrophile can displace another group, such as a hydrogen atom. Examples of electrophilic substitution reactions useful in accordance with the present invention include the substitution of hydrogen atoms on the aromatic bridging groups with electrophiles containing nitro groups, sulfonate groups or the like.

In addition to altering the bridging aromatic group, it will be appreciated that synthetic chemistries can be used to alter the pendent groups resulting from silanol derivatization (described above). It will be further appreciated that the resulting polar pendant groups can be used for additional synthetic steps depending upon the intended application of the sorbent material.

The sorbent materials can be used in any suitable form, including in powder or pellet forms. Powdered forms of the sorbent materials are characterized by a high surface area, for example, in the range of about 800 $m^2/g$, which allows for rapid and effective uptake of the sorbate. Depending upon the manner in which grinding of the sorbent materials is carried out to obtain the powdered form, the particle sizes may vary widely. Preferred powdered forms will have a high surface area (e.g., about 800 $m^2/g$) and an average particle size that is less than about 250 µm, for example, between about 50 to about 250 µm.

In some embodiments and in particular those embodiments where the sorbent material is in pellet form, the porous swellable sol-gel composition and the property modifier are combined with a binder, such as a polymeric binder. Useful polymeric binders include microcrystalline cellulose and elastomeric polymers. Preferred elastomeric polymers have a glass transition temperature below about 150 C, the temperature at which the sorbent material begins to decompose. For, example, polystyrene is a currently most preferred elastomeric polymer binder. Other suitable thermoplastic elastomers are described in U.S. Pat. Nos. 7,834,093, 7,799,873, 7,799,868, 7,799,869, 7,790,805, 7,786,206, 7,776,968, 7,771,627, 7,744,781, 7,737,206, 7,655,719, 7,462,309, 6,596,792, 6,162,849, 5,194,480, 7,837,901, 7,815,998, 7,645,399, 7,608,342, 7,550,097, 7,402,616, 6,720,369, 4,634,730, 7,834,093, 7,799,873, 7,799,868, 7,799,869, 7,790,805, 7,786,206, 7,776,968, 7,771,627, 7,744,781, 7,737,206 which patents are herein incorporated by reference.

The amount of binder will depend on the particular application and will be readily determinable by one skilled in the art. In some embodiments, the binder is present in an amount of at least 50% and in some embodiments at least 95% and in some embodiments at least 99.5% based on the weight of the sorbent material.

Pellets can be formed in any desired shape and size suitable for their desired application. For example, in some embodiments, a sol-gel solution is poured into a silicone mold before gellation. The solution is then gelled in the mold to produce a pellet having the desired dimensions.

In other embodiments, pellets are prepared by casting the sol-gel material in a die having a desired internal configuration and dimension, which will result in a polymerized sol-gel conforming to the desired size and shape. In such embodiments, the components are combined using any suitable means, such as by combining in a ball mill. The ingredients are then feed into a die using any suitable means such as by using a screw feeder or a gravity feeder. Screw feeders provide the advantage that they crush infeed particles to achieve a more favorable size consistency before compacting. In some cases, heat generated by the screw feeding process may be beneficial, for example, by softening a thermoplastic polymer binder prior to casting.

The ingredients are then compressed at a sufficient force, typically from about 1-8 tonnes, for a sufficient time, typically from about five to about ten minutes, to form a pellet. In some embodiments where the binder is a thermoplastic polymer, the die is preheated to a temperature less than the decomposition temperature of the sol-gel composition, typically less than about 150 C.

In some embodiments, the sorbent material is disposed on or within a suitable support. Useful supports include any type of solid or semi-solid object capable of directly or indirectly supporting the sorbent material. For example, the support can be any type of container, vessel, or material having at least one surface for supporting the sorbent material. By "directly" it is meant that the sorbent material is in intimate physical contact with at least one support surface. The sorbent material can be attached, bonded, coupled to, or mated with all or only a portion of the at least one surface. By "indirectly" it is meant that the sorbent material is housed by or within the support without being in direct contact with the support. For example, the sorbent material can float or be suspended in a fluid (e.g., water) that is contained by the support.

In one embodiment of the present invention, the support is a fixed bed reactor (e.g., a packed or fluidized bed reactor). The fixed bed reactor contains the sorbent material, so that the sorbent material remains stationary or substantially stationary when an aqueous media containing the contaminant to be removed is flowed through the reactor. The fixed bed reactor can include at least one inlet through which the aqueous medium containing the contaminant sorbate is supplied, and at least one outlet through which aqueous medium that is substantially free of the contaminant is discharged.

The fixed bed reactor can have any shape (e.g., cylindrical), dimensions, and orientation (e.g., vertical or horizontal). The fixed bed reactor may be stand-alone or placed directly in-line with the media containing the sorbate to be removed. In some embodiments, the fixed bed reactor additionally includes an inert, non-swelling filler or media (e.g., ground glass) to provide void spaces for swelling of the sorbent material.

In another embodiment of the present invention, the support is a filter having at least one porous membrane entirely or partially formed with, coupled to, bonded with, or otherwise in intimate contact with the sorbent material. In some embodiments, the filter has a sandwich-like configuration formed of the sorbent material disposed on or embedded between first and second porous membranes. Suitable porous membranes include materials (e.g., metals, metal alloys, or polymers) having pores of sufficient size to permit passage of the sorbent material. For example, the porous membrane can be comprised of a nano- or micro-sized polymers or polymer-blended materials, such as a nano-sized nylon-polyester blends.

In another embodiment of the present invention, the support is a vessel for holding the aqueous medium containing the sorbate to be removed. Suitable vessels include stirred tanks or vats. The sorbent material is disposed on or embedded within at least one surface of the vessel. Alternatively, the sorbent material floats or is suspended in aqueous medium containing the sorbate contained within the vessel.

The inventive method is of use for removing sorbates from a gas or an aqueous solution containing the sorbate. The inventive method is of particular use with sorbates dissolved in aqueous solutions, where the sorbates have a log $k_{ow}$>−0.32 and a molecular weight less than 1,000,000 and where the sorbates have a log $k_{ow}$>1.25 and a molecular weight less than 2,000.

The inventive method is useful in a variety of industrial remediation applications, such as remediation of aqueous streams containing organic contaminants produced by textile and/or pharmaceutical processes. The terms "remediating" and "remediation" as used herein refer to the substantially complete removal of aqueous pollutants to achieve the standard(s) set by the responsible regulatory agency for the particular contaminated aqueous media (e.g., National Primary Drinking Water Regulations for subsurface ground water).

It is a distinct benefit of the inventive method that by matching the chemistry of the sorbent material with a sorbate, the removal of a wide variety of sorbates is possible. For example, the method can be used to extract unwanted or toxic organic sorbates produced by various industrial processes. Non-limiting examples of organic sorbates include textile dyes (e.g., eosin yellow, methylene blue, malachite green, methyl orange, orange G, acid blue 25, and Congo red) and ionic surfactants (e.g., sodium dodecyl sulfate, SDS, benzalkonium chloride, polyoxyethylene sorbitan monolaurate, polyoxyethylene sorbitan mono-oleate, polyethylene glycol 300, propoxylated polyethylene glycol, polyoxyethylene 4 lauryl ether, and diethylene glycol monoethyl ether).

It is also useful in the extraction of beneficial sorbates, including biologics, such as DNA, from aqueous solutions.

In accordance with the inventive method the sorbent material is contacted with the aqueous medium containing the sorbate under conditions effective to remove sorbate. It is an advantage of the inventive method that if can be used to remove essentially all of the sorbate from the aqueous media. The specific conditions vary with the specific application and will be readily determinable by one skilled in the art. For example, it is an advantage of the inventive method that it may be performed at ambient temperature and pressure.

In preferred embodiments, sorbent material disposed on or within a support is contacted with the aqueous medium containing the sorbate to be removed. In such embodiments, the aqueous media flows through or is placed into the support so that intimate contact is made between the sorbent material and the aqueous media. And in some embodiments, the media is agitated to facilitate intimate contact.

Upon contact with the aqueous media, energy stored energy in the sorbent material is released because the porous structure relaxes to a swollen state as the sorbate disrupts the inter-particle interactions holding the sol-gel composition in the unswollen state. New surface area and void volume is thus created in the sorbent material, which exposes additional portions of the sorbent material to further capture additional sorbate as its diffuses into the expanded porous structure.

In some embodiments, the aqueous media is contacted with the sorbent material until substantially all of the sorbent has been removed from the media. In such embodiments, the media is contacted with a sufficient amount of the sorbent material to avoid complete saturation of the sorbent material. Alternatively, the aqueous media is repeatedly contacted with fresh sorbent material until substantially all of the sorbent has been removed. In other embodiments, the aqueous media is contacted with the sorbent material until the sorbent material is saturated with the molecules.

The sorbent material including the sorbed sorbate is then separated from the aqueous media. In some embodiments, the sorbent material is directly removed or collected (e.g., using tactile means) from the support. In alternative embodiments, the sorbent material is removed by centrifugation, filtration, flotation or the like.

In some embodiments, the sorbent material is regenerated from the sorbent material containing the sorbed sorbate. The sorbent material can be regenerated by any suitable method. Representative methods, include, without limitation, chemical extraction and/or thermal treatment. For example, the sorbent material containing the sorbed sorbate can be heated for a period of time and at a temperature sufficient to separate the sorbate from the sorbent material. In some embodiments, the contacting and the regeneration steps are repeated until the desired amount of sorbate has been removed from the aqueous media.

In a first example of a method in accordance with the invention, high flow remediation of a textile dye, such as acid blue 25, is carried out using a fixed bed reactor. The fixed bed reactor includes a fluid inlet, a fluid outlet, and a sorbent material formed of swellable sol-gel composition modified with polyethylenimine ("PEI"), a polar organic polymer, encased between two or more layers of a metal or metal alloy (e.g., stainless steel). The fixed bed reactor is placed directly in-line with an aqueous medium containing acid blue 25 that is constantly fed from a textile-producing facility. The aqueous media is flowed through the inlet of the fixed bed reactor so that acid blue 25 is sorbed by the sorbent material. The water discharged from the outlet of the fixed bed reactor is substantially free of acid blue 25. As the sorbent material sorbs the acid blue 25, the sorbent material can be removed from the fixed bed reactor, regenerated, e.g., by using thermal treatment, and then replaced, if needed, to continuously remove additional acid blue 25.

In a second example of a method in accordance with the invention, low flow remediation a stream of water contaminated with another textile dye, such as methylene blue, is carried out using a filter. The filter includes a sorbent material formed of a swellable sol-gel composition modified with poly(4-styrene sulfonic acid) ("PSS"), a polar organic polymer, disposed between first and second nano-porous, polymeric membranes, made of a nylon-polyester blend. The filter is placed directly in-line with the methylene blue-contaminated stream. The contaminated stream is flowed through the filter so that the methylene blue is sorbed by the sorbent material and thereby extracted from the water. The water that has been passed through the filter is substantially free of methylene blue. As the sorbent material sorbs the methylene blue and becomes swollen, the filter is removed from the contaminated stream, the sorbent material regenerated (e.g., using thermal treatment), and the filter then placed back into the stream to remove additional methylene blue. In alternative embodiments, two or more filters are used to extract the methylene blue and/or new filters can be used to replace the used filters.

In a third example of a method in accordance with the invention, the extraction of SDS, an ionic surfactant, contaminating aqueous media produced by pharmaceutical manufacture is carried out using a fillable tank. Either prior to, simultaneous with, or subsequent to the addition of the contaminated aqueous media to the fillable tank, sorbent material formed of sorbent material modified with PEI, a polar organic polymer is added to the tank. The contaminated aqueous media is then mixed thoroughly with the sorbent material using mechanical means or through fluid agitation (e.g., a vortex system). Contact of the sorbent material with the contaminated aqueous media causes the SDS to be sorbed by the sorbent material. As the sorbent mater sorbs the SDS, the sorbent material is removed from the tank by flotation, filtration, and/or centrifugation. The removed composition 10 can then be regenerated (e.g., using thermal treatment) and, if necessary, added to the tank to remove additional SDS from the aqueous media.

The following examples are for the purpose of illustration only and are not intended to limit the scope of the claims, which are appended hereto.

Example 1

Matching the Properties of Sorbent Material with Acid Blue

Anionic Sorbate

Acid blue 25 (an acidic organic sorbate) and methylene blue (a basic organic sorbate) were separately added to water (pH 6.5) at a concentration of 1 mg/mL. To 20 mL of the resulting dye media, 0.5% w/v of a sol-gel composition (Osorb®, an aromatically-bridged, organosiloxane sol-gel composition, containing a plurality of alkyl siloxy substituents, modified with PEI (a basic organic polymer)) was added and allowed to come to equilibrium (5 minutes). Control materials were made of 20 mL of each dye media and 0.5% w/v of the corresponding, unmodified Osorb®. The amount of dye was measured spectrophotometrically by a UV-visible spectrometer using the wavelength of maximum absorption for each dye.

As shown in Table 1, the Osorb® modified with PEI showed enhanced and preferred binding for of the negatively-charged organic sorbate when compared to the corresponding Osorb® without PEI (>99% vs. 5%). This is demonstrated by the absorption of acid blue 25, which possesses a sulfonic acid group that renders the sorbate negatively-charged in pH conditions greater than 0, by the Osorb® with PEI, which possesses basic amine groups distributed throughout the PEI polymer chain.

TABLE 1

Extraction of Acid Blue 25

| Material | Percent Extraction Acid Blue 25 |
|---|---|
| Osorb ® without PEI | 5% |
| Osorb ® with PEI | >99% |

In contrast, as shown in Table 2, the Osorb® without PEI did not show enhanced and preferred binding for the positively-charged organic sorbate when compared to the corresponding Osorb® without PEI (>4% vs. 3%). This is demonstrated by the poor absorption of methylene blue, which is positively-charged at all pH levels.

TABLE 2

Extraction of Methylene Blue

| Material | Percent Extraction Methylene Blue |
|---|---|
| Osorb ® without PEI | 3% |
| Osorb ® with PEI | 4% |

Example 2

Matching the Properties of Sorbent Material with Methylene Blue

Cationic Sorbate

Osorb® swellable, sol-gel composition was fully swollen with a 3.3 mg/mL media of PSS (ammonium salt) in 90% ethanol:10% water and allowed to dry.

The resulting cationic polymer modified sorbent material was then added to a 50 ppm solution of methylene blue (a cationic dye soluble in water). After 3 hours of shaking, the modified sorbent material had absorbed greater than 99% of the dye (as detected by UV-Vis spectroscopy). The corresponding unmodified Osorb® failed to reduce the dye concentration after the same incubation time.

Example 3

Matching the Properties of Sorbent Material with DNA

Anionic Sorbate

DNA is an anionic biologic sorbate with negatively charged phosphodiester linkages. Three 50 µg/mL solutions of pET17 plasmid DNA with a length of 4,4333 base pairs (Novagen, obtained from EMD Chemicals, Glasstown, N.J.) in 50 mM Tris buffer pH 8.0 were prepared. The solutions were then contacted with either unmodified Osorb®, Osorb® modified with 5 mg PEI/g Osorb® or Osorb® modified with 5 mg PSS/g Osorb®.

Adsorption of DNA was then detected by UV spectrometry at 260 nm and fluorometry using ethidium bromide as a fluorescent probe. Neither nonionic Osorb® nor Osorb® modified with PSS, an anionic polymer, extracted DNA. However, Osorb® modified with PEI, a cationic polymer, extracted over 98% of the DNA from the solution when a 5% w/v amount was used.

From the above description of the invention, those skilled in the art will perceive improvements, changes and modifications. Such improvements, changes, and modifications are within the skill of the art and are intended to be covered by the appended claims.

I claim:

1. A sorbent material comprising:
   a swellable, aromatically-bridged, organosiloxane sol-gel composition, containing a plurality of alkyl siloxy substituents, the aromatically-bridged, organosiloxane sol-gel composition having a porous matrix and
   a sorbent property modifier intermixed with at least a portion of the porous matrix, the sorbent property modifier modifying a sorbent property of the sorbent material when compared to the same sorbent property of the corresponding, unmodified sol-gel composition.

2. The sorbent material of claim 1, wherein the swellable, aromatically-bridged, organosiloxane sol-gel composition is derived from a trialkoxysilane corresponding to the formula:

$$(alkoxy)_3Si\text{—}(CH_2)_n\text{—}Ar\text{—}(CH_2)_m\text{—}Si(alkoxy)_3$$

where n and m are individually an integer from 1 to 8, Ar is a single-, fused-, or poly-aromatic ring, and each alkoxy is independently a $C_1$ to $C_5$ alkoxy.

3. The sorbent material of claim 2, wherein the trialkoxysilane is a bis(trialkoxysilylalkyl)benzene.

4. The sorbent material of claim 3, wherein the bis(trialkoxysilylalkyl)benzene is 1,4-bis(trimethoxysilylmethyl)benzene or bis(triethoxysilylethyl)benzene.

5. The sorbent material of claim 2, wherein the alkyl siloxy substituents correspond to the formula:

$$\text{—}O_x\text{—}Si\text{—}R_y$$

where R is independently a hydrocarbon containing up to about 30 carbons, x is 1 or 2, y is 2 or 3 and the total of x and y is 4.

6. The sorbent material of claim 5, wherein the alkyl siloxy substituents include at least one heteroatom selected from sulfur, oxygen, nitrogen, phosphorous or halogen atom or combinations thereof.

7. The sorbent material of claim 1, wherein the sorbent property modifier is a polymer, pendant group, coupling agent, nanoparticle or combination thereof.

8. The sorbent material of claim 7, wherein the polymer is a polar organic polymer.

9. The sorbent material of claim 8, wherein the polar organic polymer is poly(4-styrene sulfonic acid), poly(4-styrene sulfonic acid co-maleic acid), polyethylenimine, polystyrene, polyvinylphenol, polymethylmethacrylate, polyphenylene sulfide or combinations thereof.

10. The sorbent material of claim 7, wherein the sorbent property modifier is a pendant group.

11. The sorbent material of claim 7, wherein the pendant group is a polar pendant group.

12. The sorbent material of claim 11, wherein the polar pendant group is a nitro or sulfonate group.

13. The sorbent material of claim 1, wherein the sorbent property is the selectivity for a sorbate.

14. The sorbent material of claim 1, wherein the sorbent property is the capacity for a sorbate.

15. The sorbent material of claim 1, further comprising a binder.

16. The sorbent material of claim 15, wherein the binder is microcrystalline cellulose or an elastomeric polymer having a glass transition temperature below about 150° C.

17. The sorbent material of claim 16, wherein the binder is present in an amount of at least 50% based on the weight of the sorbent material.

* * * * *